US010281270B2

(12) United States Patent
Smith et al.

(10) Patent No.: US 10,281,270 B2
(45) Date of Patent: May 7, 2019

(54) MEASURING HOOKLOAD

(71) Applicant: Halliburton Management Limited, Dyce Aberdeen (GB)

(72) Inventors: Adrian E. Smith, Rochdale (GB); Matthew Hay Henderson, Inverbervie (GB); Paul Brown, Milltimber (GB)

(73) Assignee: Halliburton Energy Services, Inc., Houston, TX (US)

( * ) Notice: Subject to any disclaimer, the term of this patent is extended or adjusted under 35 U.S.C. 154(b) by 87 days.

(21) Appl. No.: 15/126,000

(22) PCT Filed: Apr. 23, 2014

(86) PCT No.: PCT/US2014/035137
§ 371 (c)(1),
(2) Date: Sep. 14, 2016

(87) PCT Pub. No.: WO2015/163869
PCT Pub. Date: Oct. 29, 2015

(65) Prior Publication Data
US 2017/0089696 A1 Mar. 30, 2017

(51) Int. Cl.
*G01L 5/04* (2006.01)
*E21B 19/00* (2006.01)
(Continued)

(52) U.S. Cl.
CPC ............ *G01B 21/16* (2013.01); *E21B 19/008* (2013.01); *E21B 19/04* (2013.01); *E21B 44/00* (2013.01);
(Continued)

(58) Field of Classification Search
CPC ................................. E21B 19/008; G01L 5/04
(Continued)

(56) References Cited

U.S. PATENT DOCUMENTS 3,382,713 A 5/1968 Chutter
3,481,189 A 12/1969 Brennan et al.
(Continued)

FOREIGN PATENT DOCUMENTS

CN 100533087 8/2009
EP 0304376 B1 5/1993
(Continued)

OTHER PUBLICATIONS

International Searching Authority, Patent Cooperation Treaty, International Search Report and Written Opinion, International application No. PCT/US2014/035137, which is a parent PCT to the instant application, dated Sep. 24, 2014.
(Continued)

*Primary Examiner* — Taras P Bemko
(74) *Attorney, Agent, or Firm* — Howard L. Speight, PLLC

(57) ABSTRACT

An apparatus includes a first cable clamp and a first apparatus section coupled to the first cable clamp. The apparatus includes a second cable clamp and a second apparatus section coupled to the second cable clamp. The second apparatus section is slidably coupled to the second apparatus section. The apparatus includes a first measuring device portion coupled to the first apparatus section, a second measuring device portion coupled to the second apparatus section, wherein the first measuring device portion and the second measuring device portion are in at least one of mechanical, optical, and electromagnetic communication.

8 Claims, 9 Drawing Sheets

(51) Int. Cl.
- *G01B 21/16* (2006.01)
- *E21B 44/00* (2006.01)
- *E21B 19/04* (2006.01)
- *E21B 47/00* (2012.01)
- *G01B 21/32* (2006.01)

(52) U.S. Cl.
CPC .......... *E21B 47/00* (2013.01); *E21B 47/0006* (2013.01); *G01L 5/04* (2013.01); *G01B 21/32* (2013.01)

(58) Field of Classification Search
USPC .......................................................... 166/66
See application file for complete search history.

(56) References Cited

U.S. PATENT DOCUMENTS

| | | | |
|---|---|---|---|
| 3,567,320 | A | 3/1971 | Chitayat |
| 3,735,244 | A | 5/1973 | Gumtau et al. |
| 3,901,597 | A | 8/1975 | White |
| 3,958,455 | A | 5/1976 | Russell |
| 3,965,736 | A | 6/1976 | Welton et al. |
| 4,275,599 | A | 6/1981 | Kohlenberger et al. |
| 4,302,978 | A | 12/1981 | Dykmans |
| 4,402,229 | A | 9/1983 | Byrne |
| 4,411,162 | A | 10/1983 | Valadier |
| 4,502,006 | A | 2/1985 | Goodwin et al. |
| 4,644,785 | A | 2/1987 | Doyle |
| 4,756,188 | A | 7/1988 | Fennell |
| 4,787,244 | A | 11/1988 | Mikolajczyk |
| 4,803,888 | A | 2/1989 | Choquet |
| 6,343,515 | B1 | 2/2002 | Dodson |
| 2001/0054317 | A1 | 12/2001 | Arms |
| 2005/0173111 | A1 | 8/2005 | Bostick |
| 2008/0035376 | A1 | 2/2008 | Freyer |
| 2011/0025349 | A1 | 2/2011 | Howard et al. |

FOREIGN PATENT DOCUMENTS

| | | |
|---|---|---|
| FR | 2592150 A1 | 6/1987 |
| FR | 2592160 A1 | 6/1987 |
| GB | 2132778 A | 7/1984 |
| RU | 2348036 C2 | 2/2009 |
| WO | 0066479 A1 | 11/2000 |

OTHER PUBLICATIONS

Roylance, Stress-Strain Curves. Aug. 23, 2001. [retrieved on Aug. 16, 2014] Retrieved from the internet<URL: http://ocw.mit.edu/courses/materials-science-and-engineering/3-11-mechanics-of-materials-fall-1999/modules/ss.pdf>, which is attached to the International Search Report and Written filed herewith.

International Searching Authority, Patent Cooperation Treaty, International Preliminary Report on Patentability, International application No. PCT/US2014/035137, which is a PCT parent to the instant application, dated Oct. 25, 2016.

European Patent Office, Communication pursuant to Rule 164(1) EPC, Application No./Patent No. 14890252.1 / 3105540 PCT/US2014035137, entire document, which is an EP counterpart to the instant application, dated Dec. 1, 2017.

Bridon Oil and Gas, Steel Rope Technical Information, pp. 30-66.

Popov, E.P., Mechanics of Materials Second Edition, 1976, pp. 37-39, Prentice-Hall, Inc., Englewood Cliffs, New Jersey.

USS Tiger Brand, Wire Rope Engineering Handbook, pp. 1-82.

MEASURING HOOKLOAD

BACKGROUND

During typical hydrocarbon drilling operations, a drill string, drill bit, and other elements of the drilling system are suspended in a borehole from a hook at the surface. The load on the hook caused by the suspended elements (i.e. the "hookload") is measured for a number of purposes, including monitoring the amount of force being applied by the drill bit to the floor of the borehole, which is referred to as weight on bit (WOB). Accurate hookload and WOB measurements are important to prolonging the usable life of the drill bit, among other uses.

DETAILED DESCRIPTION

Figure 1:
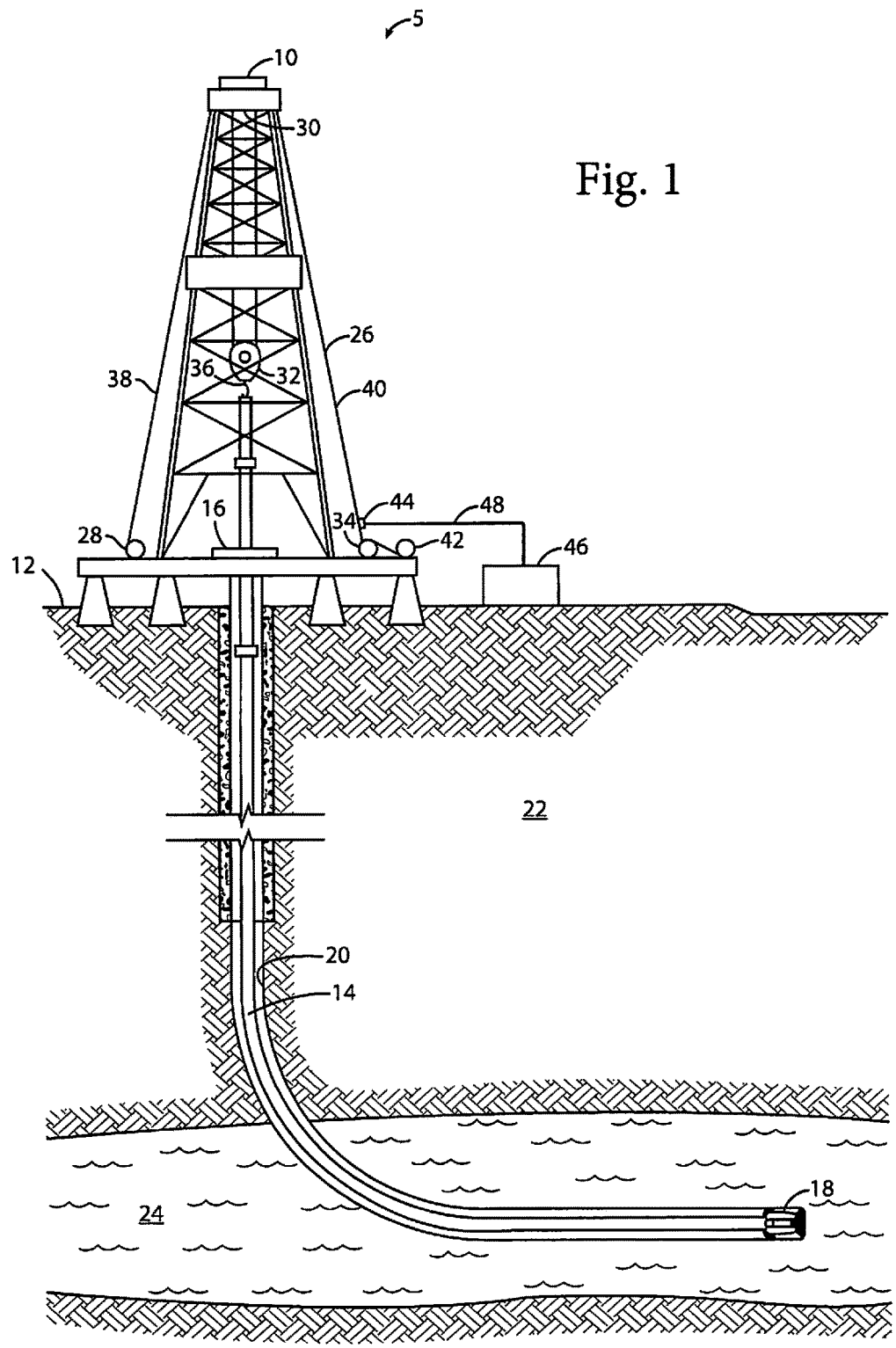
FIG. 1 illustrates a drilling system incorporating aspects of the present disclosure.

A system for drilling operations (or "drilling system") 5, illustrated in FIG. 1, can include a drilling rig 10 at the surface 12, supporting a drill string 14. In one or more embodiments, the drill string 14 is an assembly of drill pipe sections which are connected end-to-end through a work platform 16. In alternative embodiments, the drill string comprises coiled tubing rather than individual drill pipes. In one or more embodiments, drill bit 18 couples to the lower end of the drill string 14, and through drilling operations the bit 18 creates a borehole 20 through earth formations 22 and 24.

In one or more embodiments, the drilling system 5 includes a drill line 26 to raise and lower the drill string 14 in the borehole 20. In one or more embodiments, the drill line 26 is spooled on a winch or draw works 28. In one or more embodiments, the drill line 26 passes from the winch 28 to a crown block 30. In alternative embodiments, the drilling system is sea based and is mounted on a floating rig. The drill line passes from the crown block 30 to a traveling block 32 back to the crown block 30 and to an anchor 34. A hook 36 couples the traveling block 32 to the drillstring 14. The crown block 30 and the traveling block 32 act as a block-and-tackle device to provide mechanical advantage in raising and lowering the drillstring 14. In one or more embodiments, the drill line 26 includes a fast line 38 that extends from the draw works 28 to the crown block 30 and a deadline 40 that extends from the crown block 30 to the anchor 34. In one or more embodiments, a supply spool 42 stores additional drill line 26 that can be used when the drill line 26 has been in use for some time and is considered worn.

In one or more embodiments, a hookload measurement device 44 is coupled to the drill line 26 to measure the tension in the drill line 26. In one or more embodiments, signals from the hookload measurement device 44 are communicably coupled to a processor 46 by a cable 48. In one or more embodiments, the signals from the hookload measurement device 44 may be communicably coupled to the processor 46 by one or more wireless communication channels. The processor 46 may be part of an information handling system or computing device. As used herein, an information handling system or computer device may comprise a processor and a memory device, such as a non-transitory computer readable medium, communicably coupled to the processor. The memory device may contain a set of instructions that, when executed by the processor, cause the processor 46 to perform certain actions or steps. The set of instructions may comprise a computer program or other software. In certain embodiments, a non-transitory computer readable medium, such as a CD, DVD, flash drive, etc., separate from the information handling system, may contain the set of instruction or computer code.

The processor 46 may be coupled to a memory device that contains a set of instructions to cause the processor 46 to receive and process output signals from the hookload measurement device 44 to determine hookload. An output signal may comprise a voltage or current signal generated by the measurement device 44, with the amplitude of the voltage or current signal corresponding to the elongation of the drill line 26. Processing the output signals to determine the hookload may include an intermediate step of determining an elongation of the drill line 26 using the output signals, as will be described below. The processor 46 may then use the calculated hookload to, for example, calculate WOB, which is used to make a variety of decisions about drilling operations.

Figure 2:
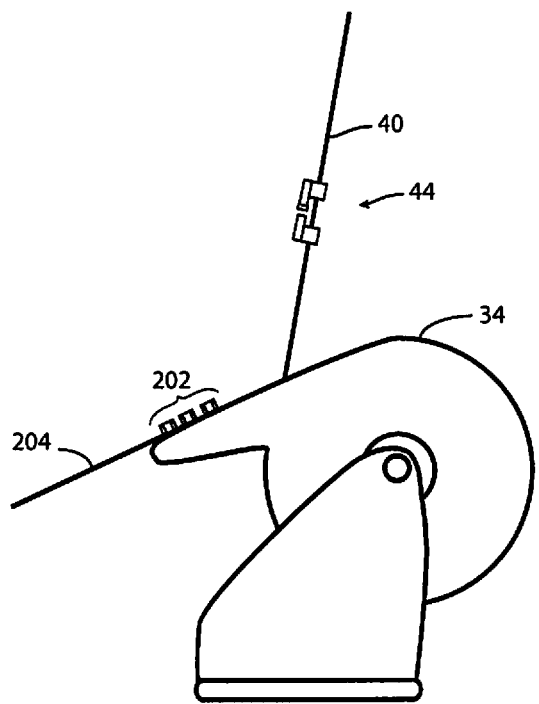
FIGS. 2 and 3 illustrate placement of a hookload measurement device in accordance with aspects of the present disclosure.
Figure 3:
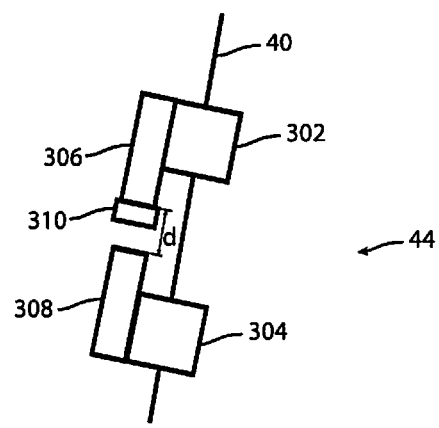

In one or more embodiments, one of which is illustrated in FIGS. 1, 2, and 3, the hookload measurement device 44 is coupled to the deadline 40. The deadline 40 is wrapped around a spool (not shown) in the anchor 34. A set of bolts 202 secure the deadline 40 to the anchor 34 during normal operations. The bolts 202 can be released for "slip and cut" operations, in which a new length of cable 204 is added to the drill line 26 from the supply spool 42.

In one or more embodiments, one of which is illustrated in FIG. 3, the hookload measurement device 44 includes a first cable clamp 302 and a second cable clamp 304. In one or more embodiments, the first cable clamp 302 and the second cable clamp 304 wrap around and securely clamp the hookload measurement device 44 to the drill line 26. In one or more embodiments, a first apparatus section 306 is coupled to the first cable clamp 302 and a second apparatus section 308 is coupled to the second cable clamp 304. In one or more embodiments, the hookload measurement device 44 includes a measuring device 310 that produces the output signal described above. In one or more embodiments, the measuring device 310 is coupled to the first apparatus section 306. In one or more embodiments, the measuring device 310 is coupled to the second apparatus section 308. In one or more embodiments (described in connection with FIGS. 6-9), the measuring device 310 comprises a first measuring device portion that is coupled to the first apparatus section 306 and a second measuring device portion that is coupled to the second apparatus section 308. In one or more embodiments, the first measuring device portion and the second measuring device portion are in at least one of mechanical, optical, and electromagnetic communication In one or more embodiments, at least a portion of the hookload measurement device 44 is fabricated of light portable material, such as glass fiber reinforced plastic, anodized aluminum, nylon, DELRIN® provided by E.I. du Pont de Nemours and Company (a thermoplastic also sold under other names such as CELCON® provided by Celanese Corporation, DURACON® provided by Polyplastics Co., Ltd. and HOSTAFORM® provided by Hoechst Aktiengesellschaft), ABS (Acrylonitrile butadiene styrene—a thermoplastic), or HDPE (High Density Polyethylene).

In one or more embodiments, the first apparatus section 306 and the second apparatus section 308 move relative to each other when affixed to the drill line 26 but are held together so that they are easily portable, as described below in connection with FIGS. 4-6. In one or more embodiments, the first apparatus section 306 and the second apparatus section 308 are clamped to the drill line 26 using the first cable clamp 302 and the second cable clamp 304, respectively, in a place that is easily reached, which, in one or more embodiments, is above the anchor 34.

In one or more embodiments, the output signal produced by the measuring device 310 is related to the elongation of a length of drill line 26, e.g., the distance "d" between the first apparatus section 306 and the second apparatus section 308 (reference points other than those shown in FIG. 3 could be used).

Figure 4A:
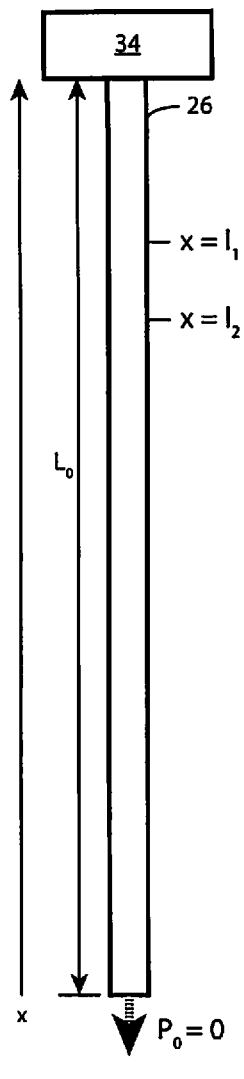
FIGS. 4A and 4B illustrate the forces acting on a drill line in accordance with aspects of the present disclosure.

An equation for elongation is derived as follows with reference to FIGS. 4A and 4B. FIG. 4A shows a model of the drill line 26 restrained at one end by the anchor 34 (represented as a box in FIGS. 4A and 4B and more realistically illustrated in FIG. 2) in which the drill line 26 is treated as a column. It is believed that the crown block 30 and traveling block 32 do not affect the analysis and they are not shown. The drill line 26 has an initial length of $L_0$ and in FIG. 4A has no force exerted on its lower end (at x=0), meaning that the drill line 26 is unloaded or is carrying a standby load. The first apparatus section 306 is attached to the drill line 26 at a location $x=l_1$ and the second apparatus section 308 is attached to the drill line 26 at a location $x=l_2$.

Figure 4B:
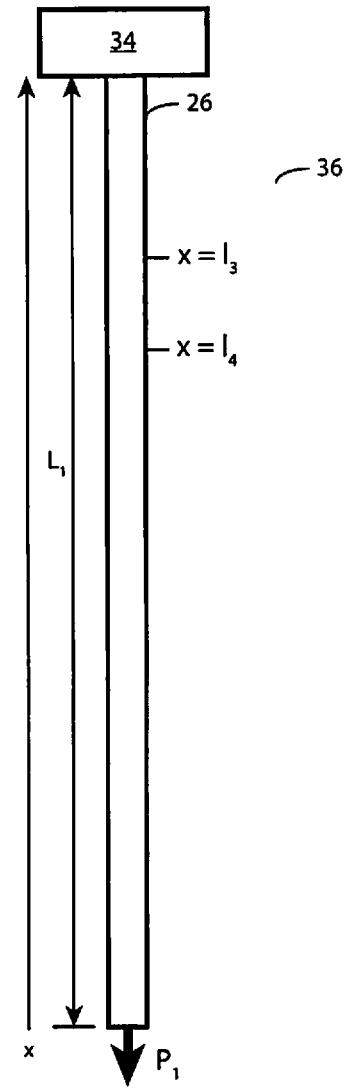

In FIG. 4B, a load $P_1$ is applied to the drill line 26 (e.g., the drill line 26 begins to lower the drill string 14 into the borehole 20). The drill line 26 stretches to have a length $L_1$ and the first apparatus section 306 is attached to the drill line 26 at a location $x=l_3$ and the second apparatus section 308 is attached to the drill line 26 at a location $x=l_4$.

The amount of elongation that can be detected by the first apparatus section 306 and the second apparatus section 308 is:

$$d=(l_3-l_4)-(l_1-l_2) \quad (1)$$

The elongation value can be determined using Hooke's law as follows:

$$d = \int_{l_1}^{l_2} \frac{P_1 dx}{AE} \quad (2)$$

where
A is the cross-sectional area of the drill line 26, which is assumed to be a constant, and
E is the elastic modulus of the material from which the drill line 26 is made.

Note that equation (2) ignores all elongations other than elastic elongation. That is, it is assumed that inelastic elongation, elongation due to rotation or wear, elongation due to thermal expansion and contraction, etc. are minimal.

Since $P_1$, A, and E are constants, equation (2) can be rewritten as:

$$d = \frac{P_1}{AE} \int_{l_2}^{l_1} dx \quad (3)$$

Solving the integral and evaluating it over the range of integration produces the following:

$$d = \frac{P_1(l_1 - l_2)}{AE} \quad (4)$$

Solving for $P_1$:

$$P_1 = AE \cdot \frac{d}{(l_1 - l_2)} \quad (5)$$

Examining equation (5), it can be seen that hookload $P_1$ is proportional to the ratio of the change in distance between the first apparatus section 306 and the second apparatus section 308 caused by the load (i.e., d or "loaded distance") and the unloaded distance between the first apparatus section 306 and the second apparatus section (i.e., $l_1-l_2$).

In one or more embodiments, the unloaded distance between the first apparatus section 306 and the second apparatus section (i.e., $l_1-l_2$) is adjusted according to the measurement technique used (e.g., the techniques described in connection with FIGS. 6-8 below), the accuracy desired from the measurement device 310, and the convenience of attaching the measuring device 310 to the drill line 26. As can be seen from equation (5), adjusting $l_1-l_2$ to a low value will make the calculation of $P_1$ more sensitive to the measurement of d than adjusting $l_1-l_2$ to a high value.

In one or more embodiments, the measuring device 310 does not put any stress or strain on the drill line 26. In particular, the measuring device does not crimp or otherwise deform the drill line 26.

In one or more embodiments, the measuring device 310 can use fiber optic light, laser, inductive components or variable linear transformers. In one or more embodiments, an output signal from the measurement device corresponding to the elongation of the drill line 26 is received the processor 46. As described above, an output signal may comprise a voltage or current signal generated by the measuring device 310, with the amplitude of the voltage or current signal corresponding to the elongation of the drill line 26. Once received, the processor 46 may calculate the elongation and hook-load using the output signal, or may transmit or otherwise provide the received output signal and/or calculated elongation to a second information handling system that may calculate the hookload. In one or more embodiments, the processor 46 or the second information handling system may perform derivative calculations using the calculated hookload which will benefit from the accuracy of the hookload measuring device 44 and hence will improve the drilling operation.

Figure 5:
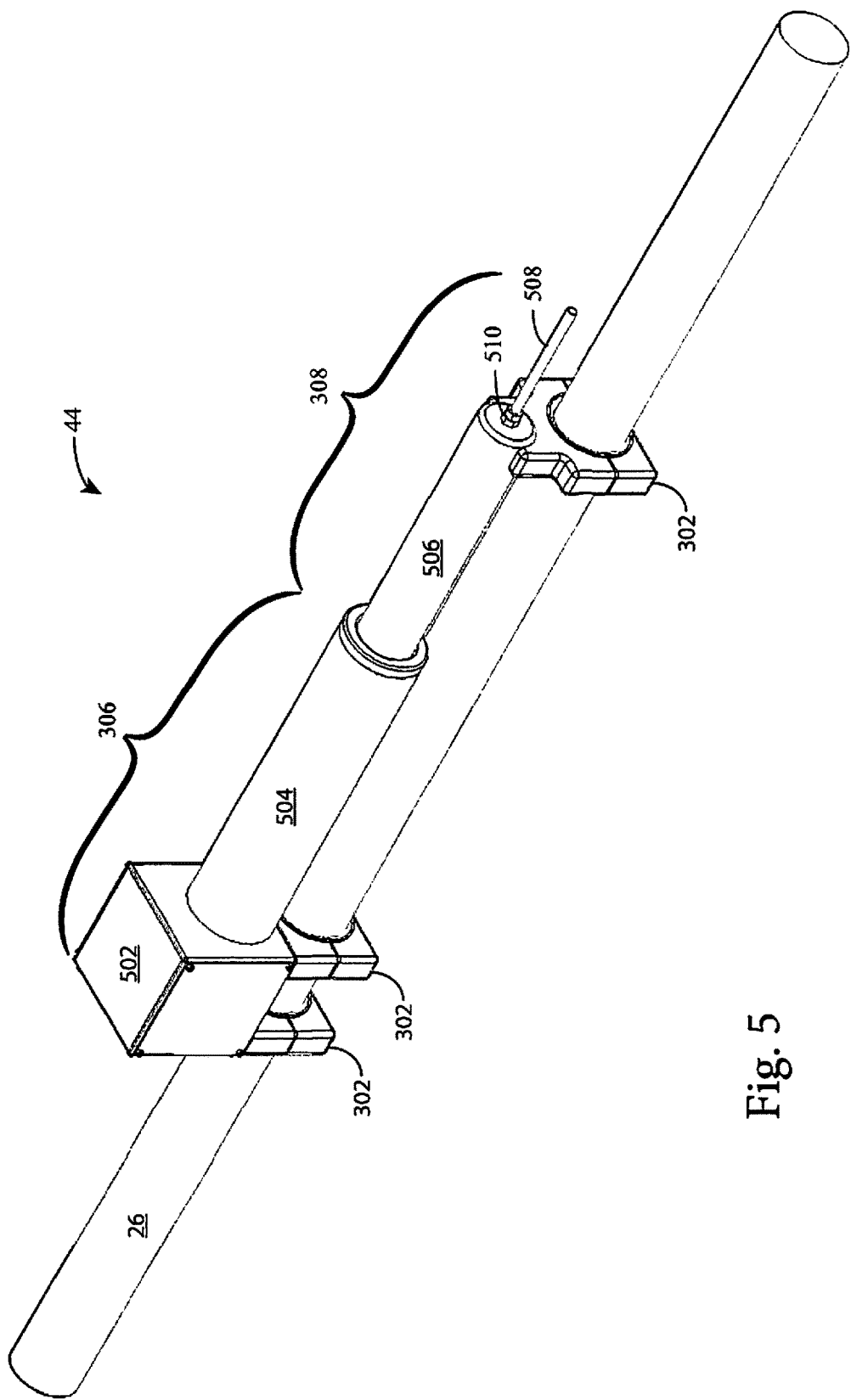
FIG. 5 is a perspective view of an example hookload measurement device in accordance with aspects of the present disclosure.

In one or more embodiments, shown in FIG. 5, the first apparatus section 306 of the hookload measurement device 44 includes a sensor mount 502, a transducer mount 504, and a rod guide 506. In one or more embodiments, the sensor mount 502 is coupled to the first cable clamp 302, which is shown in FIG. 5 in two parts for stability of mounting to the drill line 26. In one or more embodiments, the transducer mount 504 is fixedly coupled to the sensor mount 502. In one or more embodiments, the rod guide 506 is slidably coupled to the transducer guide 506, which allows the rod guide 506 to slide into and out of the transducer guide in a telescope-like manner. In one or more embodiments, a rod 508 is slidably coupled to the rod guide 506. In one or more embodiments, a rod nut 510 tightens to secure the rod 508 in place. In one or more embodiments, the position of the rod 508 relative to the rod guide 506 is adjustable by loosening the rod nut 510, sliding the rod 508 into or out of the rod guide 506 to the desired location, and tightening the rod nut 510.

Figure 6:
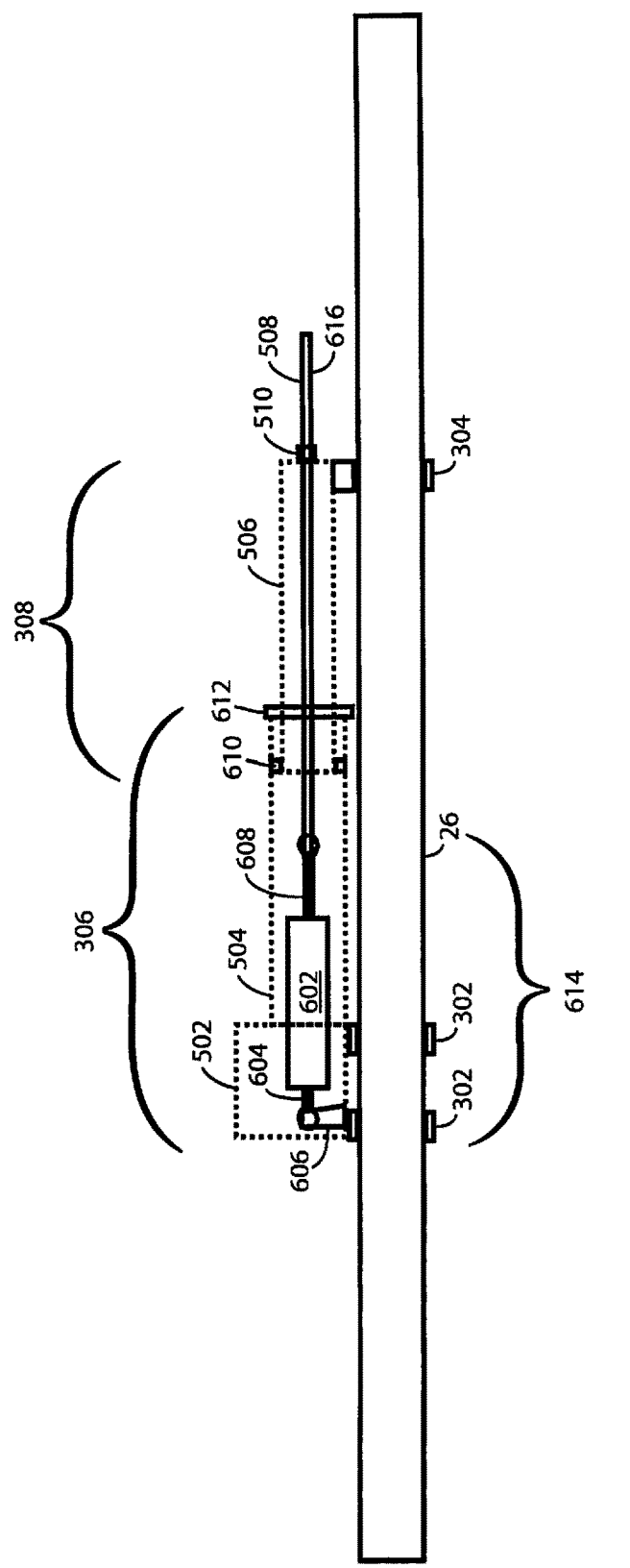
FIGS. 6-8 are cross-sectional views of example embodiments of hookload measurement devices in accordance with aspects of the present disclosure.

FIG. 6 illustrates a cross-sectional view of one or more embodiments of the hookload measurement device 44, in which the sensor mount 502, the transducer guide 504, and rod guide 506 are shown in dashed lines to allow the interior workings to be seen. In one or more embodiments, the hookload measurement device 44 includes a linear transducer 602. In one or more embodiments, the linear transducer 602 includes a support rod 604 that is coupled to a clevis bracket 606, which is coupled to the first cable clamp 302. In one or more embodiments, the linear transducer 602 includes a transducer rod 608 that is coupled to the rod 506. The linear transducer 602 may be communicably coupled to a processor, such as through the cable 48, although that connection is not shown for simplicity.

As illustrated in FIG. 6:
the first apparatus section 306 can include the clevis bracket 606, the sensor mount 502, and the transducer guide 504, and can be coupled to the first cable clamp 302,
the second apparatus section 308 can include the rod guide 506, and can be coupled to the second cable clamp 304,
a first measuring device portion 614 can include the linear transducer 602, the support rod 604, and the transducer rod 608, which can be coupled to the first apparatus section 306, and
a second measuring device portion 616 can include the rod 508, and can be coupled to the second apparatus section 308.

In operation, as the drill line 26 elongates or contracts, the distance between the first cable clamp 302 and the second cable clamp 304 changes. The change in position of the first cable clamp 302 relative the second cable clamp 304 causes the rod guide 506 to move relative to the sensor mount 502. Since the rod 508 is fixed to the rod guide 506 by the rod nut 510, rod 508 moves the transducer rod 608 in and out of the linear transducer 602. The linear transducer 602 detects the movement of the transducer rod 608 and produces a signal that is reflective of that movement. The resulting signal is transmitted to the processor 46 by the cable 48.

Figure 7:
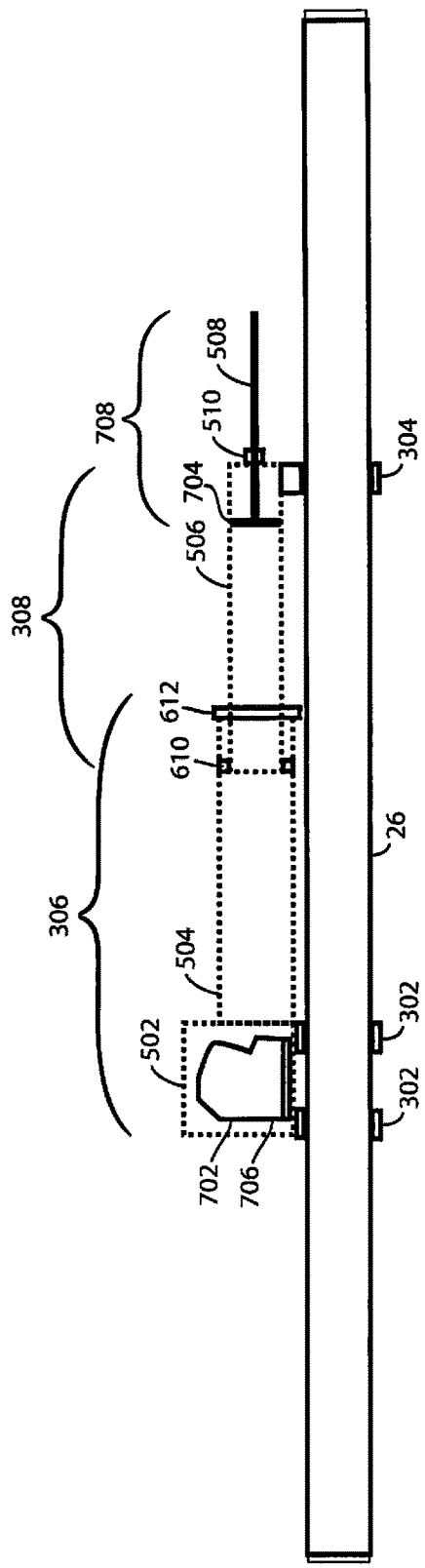

FIG. 7 illustrates aspects of the hookload measurement device 44, in which the sensor mount 502, the transducer guide 504, and rod guide 506 are shown in dashed lines to allow the interior workings to be seen, as in FIG. 6. In one or more embodiments, the hookload measurement device 44 includes an opto-reflective sensor 702. In one or more embodiments, the hookload measurement device 44 also includes a reflector 704 coupled to the rod 508.

As illustrated in FIG. 7:
the first apparatus section 306 can include the sensor mount 502 and the transducer guide 504, and can be coupled to the first cable clamp 302,
the second apparatus section 308 can include the rod guide 506, and can be coupled to the second cable clamp 304,
a first measuring device portion 706 can include the opto-reflective sensor, and can be coupled to the first apparatus section 306, and
a second measuring device portion 708 can include the rod 508 and the reflector 704, and can be coupled to the second apparatus section 308.

In operation, as the drill line 26 elongates or retracts, the distance between the first cable clamp 302 and the second cable clamp 304 changes. The change in position of the first cable clamp 302 relative the second cable clamp 304 causes the rod guide 506 to move relative to the sensor mount 502. Since the rod 508 is fixed to the rod guide 506 by the rod nut 510, rod 508 moves the reflector 704 with respect to the opto-reflector 702. The opto-reflector 702 emits an optical signal, such as a laser beam, that reflects from the reflector 704 back to the opto-reflective sensor 702. The opto-relective sensor 702 determines the distance between the opto-reflective sensor 702 and the reflector 704 from the transit time of the optical signal. The determined distance is transmitted to the processor 46 by the cable 48 (not shown in FIG. 7).

Figure 8:
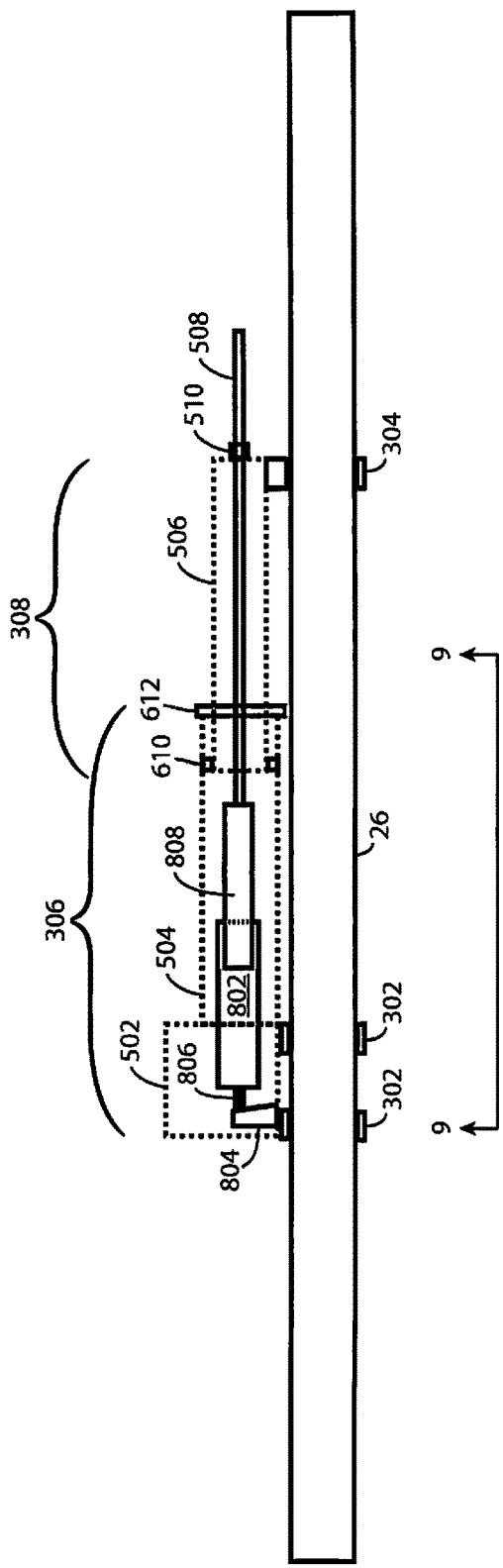
Figure 9:
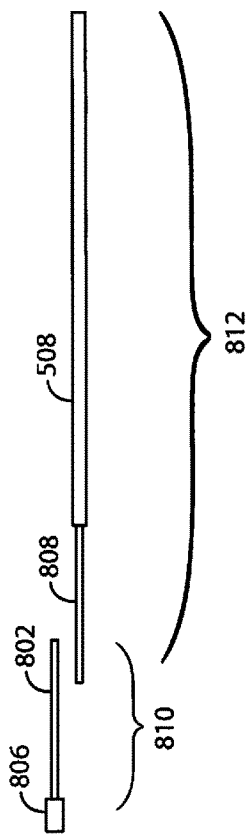
FIG. 9 is a cross-sectional view of an example hookload measurement device in accordance with aspects of the present disclosure.

FIG. 8 illustrates a one or more aspects of the hookload measurement device 44, in which the sensor mount 502, the transducer guide 504, and rod guide 506 are shown in dashed lines to allow the interior workings to be seen. In one or more embodiments, the hookload measurement device 44 includes an antenna 802 supported from a bracket 804, which is coupled to the first cable clamp 302, through an antenna support 806. In one or more embodiments, the hookload measurement device 44 includes a target 808 that is coupled to the rod 508, so that the target 808 moves relative to the antenna 802 as the first cable clamp 302 moves relative to the second cable clamp 304 as the drill line 26 elongates or contracts. In one or more embodiments, the target 808 is offset from the antenna 802, as shown in FIG. 9. In one or more embodiments, the antenna 802 and the target 808 are an inductive linear transducer, which inductively measures the position of the target 808 relative to the antenna 802. In one or more embodiments, the antenna 802 provides the relative position to the processor 46 via the cable 46 (not shown in FIG. 8).

As shown in FIGS. 8 and 9:
the first apparatus section 306 can include the bracket 804, the antenna support 806, the sensor mount 502, and the transducer guide 504, and can be coupled to the first cable clamp 302,
the second apparatus section 308 can include the rod guide 506, and can be coupled to the second cable clamp 304,
a first measuring device portion 810 can include the antenna 802, and can be coupled to the first apparatus section 306, and
a second measuring device portion 812 can include the rod 508 and the target 808, and can be coupled to the second apparatus section 308.

In one or more embodiments (not shown in the figures), the hookload measurement device 44 includes a white light interferometer to measure the distance between the first apparatus section 306 and the second apparatus section 308.

In one or more embodiments (not shown in the figures), the hookload measurement device 44 includes two bundles of optical fibres. In one or more embodiments, light dispersed from one bundle is sensed by the other and reflectometry of the sensed light is analyzed to measure the distance between the first apparatus section 306 and the second apparatus section 308.

In one or more embodiments (not shown in the figures), the hookload measurement device 44 includes a solenoid coil, having a longitudinal axis and a bore through the longitudinal axis, coupled to the first apparatus section 306 and a ferrous rod coupled to the second apparatus section 308. In one or more embodiments, the ferrous rod extends into the bore of the solenoid coil by an amount related to the distance between the first apparatus section and the second apparatus section. In one or more embodiments, the inductance of the solenoid coil is varied by the amount of the ferrous rod that extends into its bore. In one or more embodiments, the inductance is measured to determine d.

Figure 10:
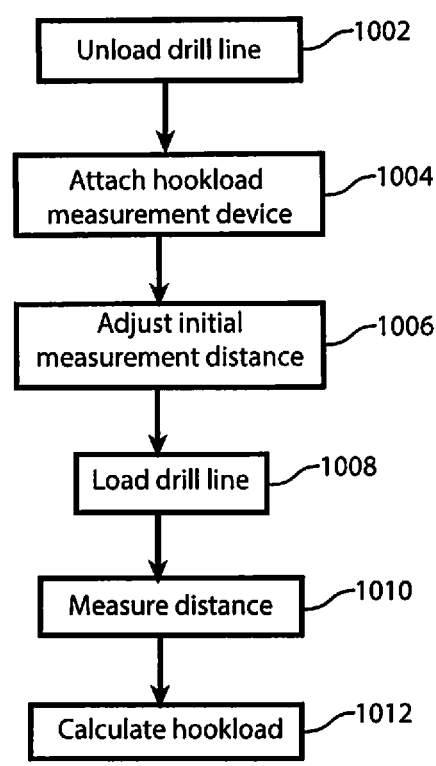
FIG. 10 is a flow chart in accordance with aspects of the present disclosure.

In one or more embodiments of use, for example as illustrated in FIG. 10, the drill line 26 is unloaded or loaded with a "standby load" (block 1002), i.e., by uncoupling the drill line 26 from the drill string 14 or engaging a structure on the drilling rig (not shown) to perform this function. In one or more embodiments, the hookload measurement device is attached to the drill line 26 (block 1004) as shown, for example in FIGS. 2, 3, and 5-9. In one or more embodiments, the initial measurement distance (i.e., $l_1-l_2$ in equation (5)) is adjusted as discussed above (block 1006). In one or more embodiments, the drill line is loaded (block 1008), for example by coupling the drill line 26 to the drill string 14. In one or more embodiments, the loaded measurement distance (i.e., d in equation (5)) is measured. In one or more embodiments, hookload ($P_1$) is calculated using equation (5).

Figure 11:
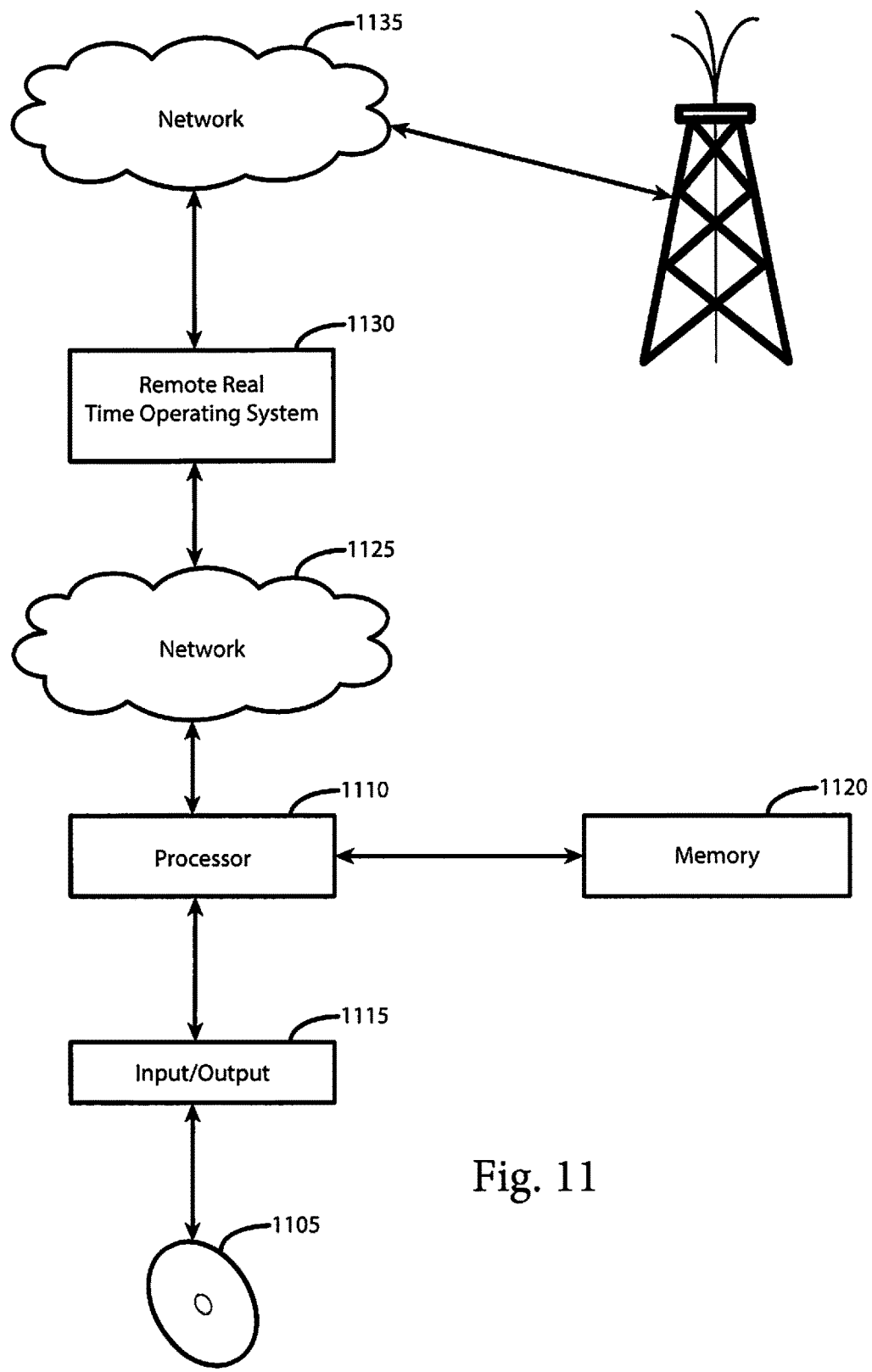
FIG. 11 illustrates an environment in accordance with aspects of the present disclosure.

In one or more embodiments, shown in FIG. 11, the hookload measurement device 44 is controlled by software in the form of a computer program on a non-transitory computer readable media 1105, such as a CD, a DVD, a USB drive, a portable hard drive or other portable memory. In one or more embodiments, a processor 1110, which may be the same as or included in the processor 46, reads the computer program from the computer readable media 1105 through an input/output device 1115 and stores it in a memory 1120 where it is prepared for execution through compiling and linking, if necessary, and then executed. In one or more embodiments, the system accepts inputs through an input/output device 1115, such as a keyboard or keypad, mouse, touchpad, touch screen, etc., and provides outputs through an input/output device 1115, such as a monitor or printer. In one or more embodiments, the system stores the results of calculations in memory 1120 or modifies such calculations that already exist in memory 1120.

In one or more embodiments, the results of calculations that reside in memory 1120 are made available through a network 1125 to a remote real time operating center 1130. In one or more embodiments, the remote real time operating center 1130 makes the results of calculations available through a network 1135 to help in the planning of oil wells 1140 or in the drilling of oil wells 1140.

References in the specification to "one or more embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention include features, methods or processes that may be embodied within machine-executable instructions provided by a machine-readable medium. A computer-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a computer-readable medium includes non-transitory volatile and/or non-volatile media (e.g., read only memory (ROM), random access memory (RAM), magnetic disk storage media, optical storage media, flash memory devices, etc.), as well as transitory electrical, optical, acoustical or other form of propagated signals (e.g., carrier waves, infrared signals, digital signals, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. One or more embodiments of the invention include software, data processing hardware, data processing system-implemented methods, and various processing operations, further described herein.

One or more figures show block diagrams of systems and apparatus for a system for monitoring hookload, in accordance with one or more embodiments of the invention. One or more figures show flow diagrams illustrating operations for monitoring hookload, in accordance with one or more embodiments of the invention. The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
   measuring, with a drill line unloaded, an unloaded distance between:
   a first apparatus section coupled to the drill line at a first point on the drill line, and a second apparatus section coupled to the drill line at a second point on the drill line;
   measuring, with a drill-string load on the drill line, a loaded distance between the first apparatus section and the section apparatus section;
   computing a hookload using the unloaded distance and the loaded distance;
   wherein measuring comprises using a technique selected from the group consisting of: measuring interference in light traveling between the first apparatus section and the second apparatus section;
   measuring a transit time of light between the first apparatus section and the second apparatus section;
   measuring a position of a transducer rod in a linear transducer:
   measuring an inductance of a solenoid coil in the first apparatus section as affected by a distance a rod coupled to the section apparatus section extends into the coil; and
   measuring an interaction between a first coil coupled to the first apparatus section and a second coil coupled to the second apparatus section.

2. The method of claim 1 further comprising:
   unloading the drill line;
   coupling the first apparatus section to the drill line at the first point on the drill line; and
   coupling the second apparatus section to the drill line at the second point on the drill line.

3. The method of claim 1 wherein computing the hookload comprises:
   calculating:

$$P\_1 = AE \cdot \frac{d}{(l\_1 - l\_2)}$$

where
$P_1$ is the hookload,
A is a cross-section area of the drill line,
E is an elastic modulus of a material from which the drill line is made,
$l_1 - l_2$ is the unloaded distance, and
d is the loaded distance.

4. A system comprising:
   a drilling system comprising a drilling line;
   a first apparatus section coupled to the drill line at a first point on the drill line,
   a second apparatus section coupled to the drill line at a second point on a drill line; a processor communicatively coupled to a memory; and
   a computer program comprising executable instructions stored on the memory that, when executed, cause the processor to perform a method comprising:
   determining, based on a first output signal from a measurement device and with a drill line unloaded, an unloaded distance between the first apparatus section and the second apparatus section coupled to the drill line;
   determining, based on a second output signal from the measurement device and with a drill-string load on the drill line, a loaded distance between the first apparatus section and the section apparatus section; and
   computing a hookload using the unloaded distance and the loaded distance;
   wherein the measuring device comprises;
   a linear transducer coupled to the first apparatus section; and
   a transducer rod coupled to the linear transducer wherein the transducer rod is movable relative to the first apparatus section;
   wherein the linear transducer senses a position of the transducer rod relative to the first apparatus section; and
   wherein a relative movement between the first apparatus section and the second apparatus section causes the transducer rod to move relative to the first apparatus section.

5. The system of claim 4 wherein the measuring device comprises
   a first measuring device portion coupled to the first apparatus section; and
   a second measuring device portion coupled to the second apparatus section.

6. A system comprising:
   a drilling system comprising a drilling line;
   a first apparatus section coupled to the drill line at a first point on the drill line,
   a second apparatus section coupled to the drill line at a second point on a drill line; a processor communicatively coupled to a memory; and
   a computer program comprising executable instructions stored on the memory that, when executed, cause the processor to perform a method comprising:
   determining, based on a first output signal from a measurement device and with a drill line unloaded, an unloaded distance between the first apparatus section and the second apparatus section coupled to the drill line;
   determining, based on a second output signal from the measurement device and with a drill-string load on the drill line, a loaded distance between the first apparatus section and the section apparatus section; and
   computing a hookload using the unloaded distance and the loaded distance;
   wherein the measuring device comprises:
   a reflector coupled to the second apparatus section; and
   an opto-reflective sensor coupled to the first apparatus section;
   wherein the opto-reflective sensor senses a distance between the opto-reflective sensor and the reflector.

7. A system comprising:
   a drilling system comprising a drilling line;
   a first apparatus section coupled to the drill line at a first point on the drill line,
   a second apparatus section coupled to the drill line at a second point on a drill line; a processor communicatively coupled to a memory; and
   a computer program comprising executable instructions stored on the memory that, when executed, cause the processor to perform a method comprising:
   determining, based on a first output signal from a measurement device and with a drill line unloaded, an unloaded distance between the first apparatus section and the second apparatus section coupled to the drill line;
   determining, based on a second output signal from the measurement device and with a drill-string load on the drill line, a loaded distance between the first apparatus section and the section apparatus section; and computing a hookload using the unloaded distance and the loaded distance; wherein the measuring device comprises:

an antenna coupled to the first apparatus section; a target coupled to the second apparatus section;

wherein the antenna detects the position of the target inductively.

8. A system comprising:

a drilling system comprising a drilling line;

a first apparatus section coupled to the drill line at a first point on the drill line, a second apparatus section coupled to the drill line at a second point on a drill line; a processor communicatively coupled to a memory; and a computer program comprising executable instructions stored on the memory that, when executed, cause the processor to perform a method comprising:

determining, based on a first output signal from a measurement device and with a drill line unloaded, an unloaded distance between the first apparatus section and the second apparatus section coupled to the drill line;

determining, based on a second output signal from the measurement device and with a drill-string load on the drill line, a loaded distance between the first apparatus section and the section apparatus section; and computing a hookload using the unloaded distance and the loaded distance wherein the measuring device comprises:

a solenoid coil coupled to the first apparatus section; the solenoid coil comprising:

a longitudinal axis, and a bore through the longitudinal axis;

a ferrous rod coupled to the second apparatus section;

wherein the ferrous rod extends into the bore of the solenoid coil by an amount related to the distance between the first apparatus section and the second apparatus section.

* * * * *